United States Patent
Umeda et al.

(10) Patent No.: US 8,279,543 B2
(45) Date of Patent: Oct. 2, 2012

(54) LENS DRIVE UNIT, LENS BARREL AND IMAGING APPARATUS

(75) Inventors: Makoto Umeda, Osaka (JP); Kenichi Miyamori, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/979,433

(22) Filed: Dec. 28, 2010

(65) Prior Publication Data
US 2011/0267712 A1 Nov. 3, 2011

(30) Foreign Application Priority Data

Dec. 28, 2009 (JP) ................................. 2009-297392

(51) Int. Cl.
*G02B 7/02* (2006.01)
*G02B 15/14* (2006.01)
(52) U.S. Cl. ......... 359/823; 359/814; 359/824; 359/694
(58) Field of Classification Search .................. 359/814, 359/823, 824, 694–698; 369/44.14–44.16, 369/112.23, 112.24; 355/53, 72–75; 396/20; 720/681, 683; 310/323.01
See application file for complete search history.

(56) References Cited

U.S. PATENT DOCUMENTS

| | | | |
|---|---|---|---|
| 6,359,679 B1 * | 3/2002 | Ito et al. | 355/75 |
| 6,683,831 B2 * | 1/2004 | Tanaka et al. | 369/44.14 |
| 7,225,452 B2 * | 5/2007 | Nagai | 720/681 |
| 7,339,756 B2 * | 3/2008 | Tengeiji et al. | 359/811 |
| 7,656,073 B2 * | 2/2010 | Doshida et al. | 310/330 |
| 7,697,381 B2 * | 4/2010 | Katou et al. | 369/44.15 |
| 2006/0033818 A1 | 2/2006 | Wada et al. | |

FOREIGN PATENT DOCUMENTS

| | | |
|---|---|---|
| JP | 2003-255422 | 9/2003 |
| JP | 2006-053358 A | 2/2006 |
| WO | 2007/055356 A1 | 5/2007 |

* cited by examiner

*Primary Examiner* — Loha Ben
(74) *Attorney, Agent, or Firm* — Renner, Otto, Boisselle & Sklar, LLP

(57) ABSTRACT

A lens drive unit includes a movable member with lenses; and a guide portion configured to movably guide the movable member back and forth along a predetermined direction and rotatably guide the movable member about a predetermined rotational axis in a plane perpendicular to an optical axis of the lens. A distance r between the gravity center of the movable member and the rotational axis satisfies the following expression (A):

$$r \leq \sqrt{0.2 J/M} \tag{A}$$

4 Claims, 16 Drawing Sheets

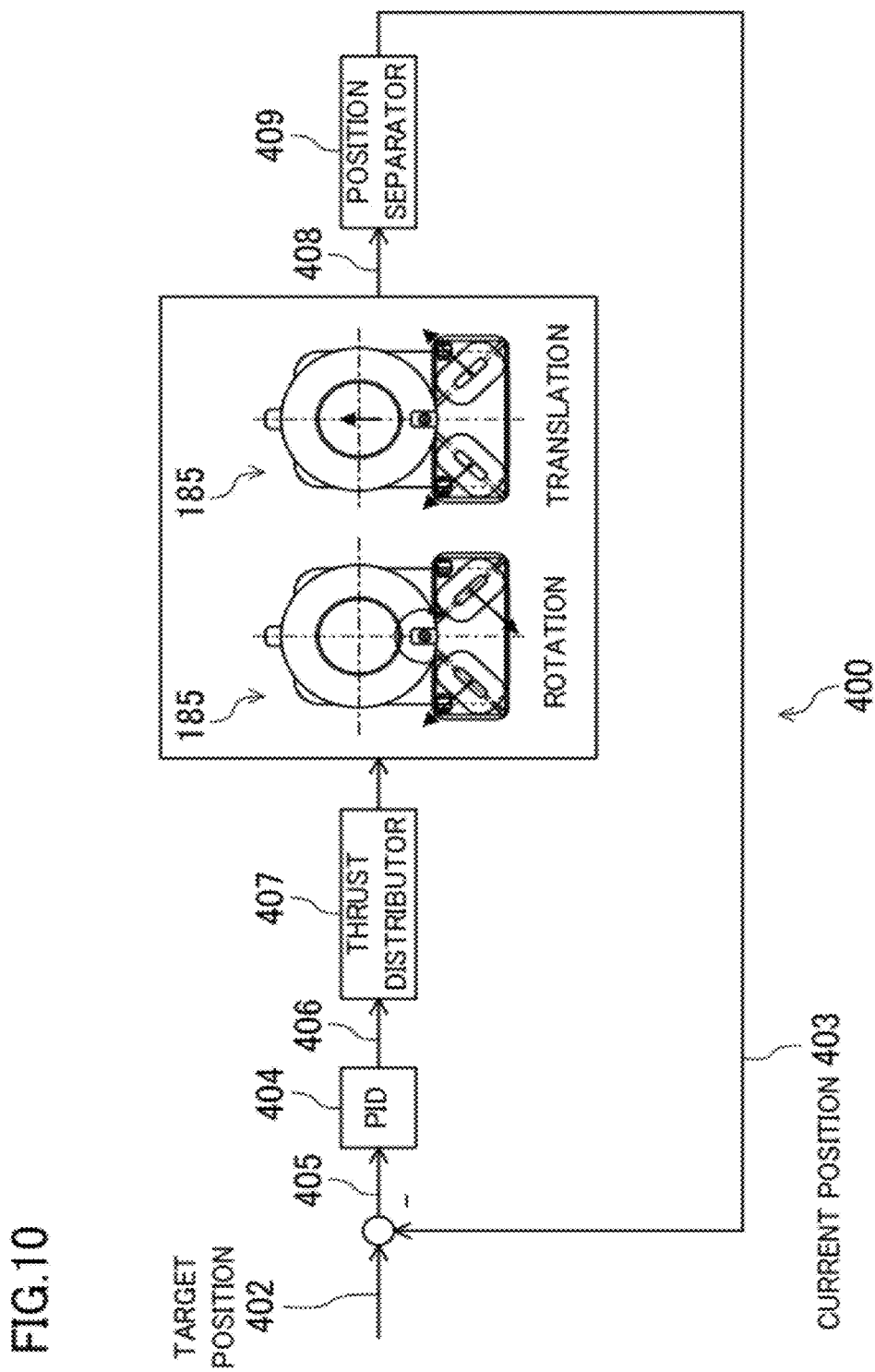

LENS DRIVE UNIT, LENS BARREL AND IMAGING APPARATUS

CROSS-REFERENCE TO RELATED APPLICATION

This application claims priority to Japanese Patent Application No. 2009-297392 filed on Dec. 28, 2009, the disclosure of which including the specification, the drawings, and the claims is hereby incorporated by reference in its entirety.

BACKGROUND

A technique disclosed herein relates to a lens drive unit, a lens barrel, and an imaging apparatus.

In recent years, digital still cameras and camcorders have been widely available, and many of such apparatus includes image stabilizing devices configured to correct an image blur.

For example, an image stabilizing device of International Publication No. 2007/055356 includes a movable member movable relative to frames and holding a lens. An elongated guide hole is provided in the movable member. A guide pin fixed to the frames is fitted into the guide hole. Thus, the movable member is supported by the frames so as to translationally move along a longitudinal direction of the long hole, and to rotate about the guide pin. An actuator configured to drive the movable member in the longitudinal direction of the long hole and an actuator configured to drive the movable member in a circumferential direction around the guide pin are provided in a part of the movable member on a side opposite to the guide hole relative to the lens.

In the image stabilizing device configured as described above, the two actuators are used as necessary. This allows the lens held by the movable member to move in the longitudinal direction of the long hole and the circumferential direction around the guide pin in a plane perpendicular to an optical axis of the lens, thereby correcting an image blur.

SUMMARY

However, in the configuration in which the movable member holding the lens rotates about the guide pin, centrifugal force or Coriolis force is generated in the movable member. Such force acts on the movable member as disturbance which is not drive force essentially acting on the movable member. In particular, in the image stabilizing device of International Publication No. 2007/055356, the gravity center of the movable member is extremely eccentric to a rotational axis of the movable member. Thus, the centrifugal force or the Coriolis force is increased, resulting in greater disturbance. Consequently, it is difficult to drive the movable member as desired, thereby causing a problem on controllability of the movable member.

The technique disclosed herein has been made in view of the foregoing, and it is an objective of the technique to improve controllability of a rotatably-supported movable member.

The technique disclosed herein is intended for a lens drive unit. The lens drive unit includes a movable member with a lens; and a guide portion configured to movably guide the movable member back and forth along a predetermined direction and rotatably guide the movable member about a predetermined rotational axis, in a plane perpendicular to an optical axis of the lens. A distance r between the gravity center of the movable member and the rotational axis satisfies the following expression (A):

$$r \leq \sqrt{0.2 J/M} \quad (A)$$

where "J" represents inertia moment of the movable member about the gravity center, and "M" represents mass of the movable member.

According to the lens drive unit, controllability of the rotatably-supported movable member can be improved.

BRIEF DESCRIPTION OF THE DRAWINGS

FIG. 10 is a block diagram of a control unit of the image stabilizing device.

DETAILED DESCRIPTION

Examples of embodiments will be described below in detail with reference to the drawings.

First Embodiment of the Present Disclosure

Figure 1:
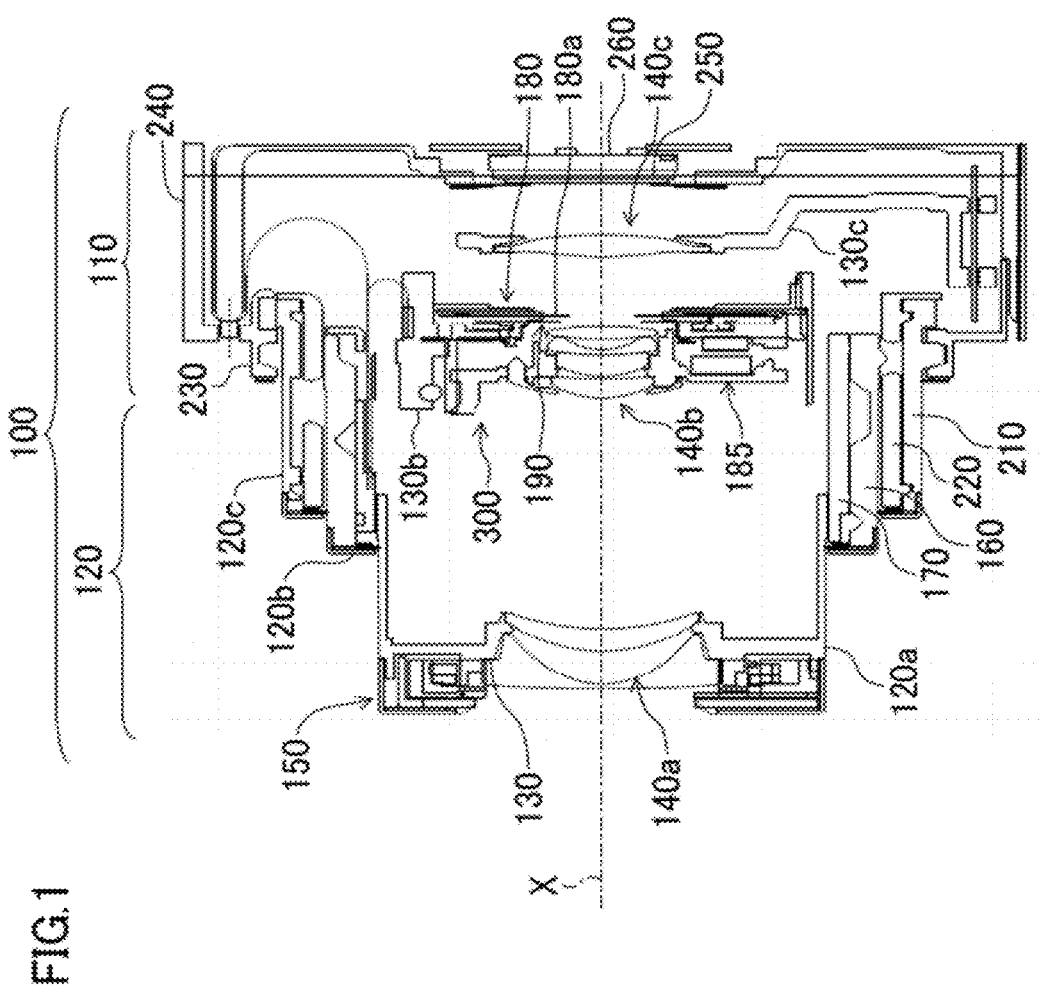
FIG. 1 is a cross-sectional view of a lens barrel in a wide-angle end.
Figure 2:
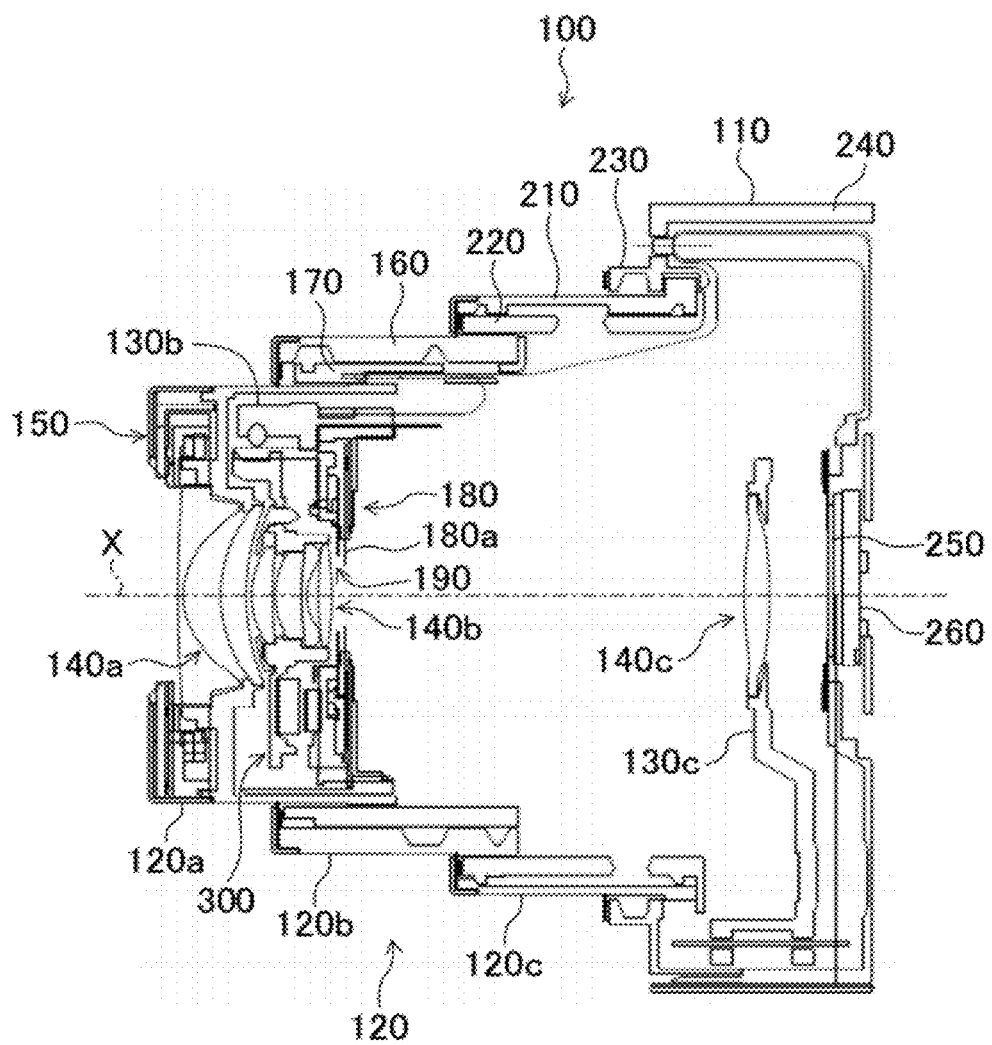
FIG. 2 is a cross-sectional view of the lens barrel in a tele end.
Figure 3:
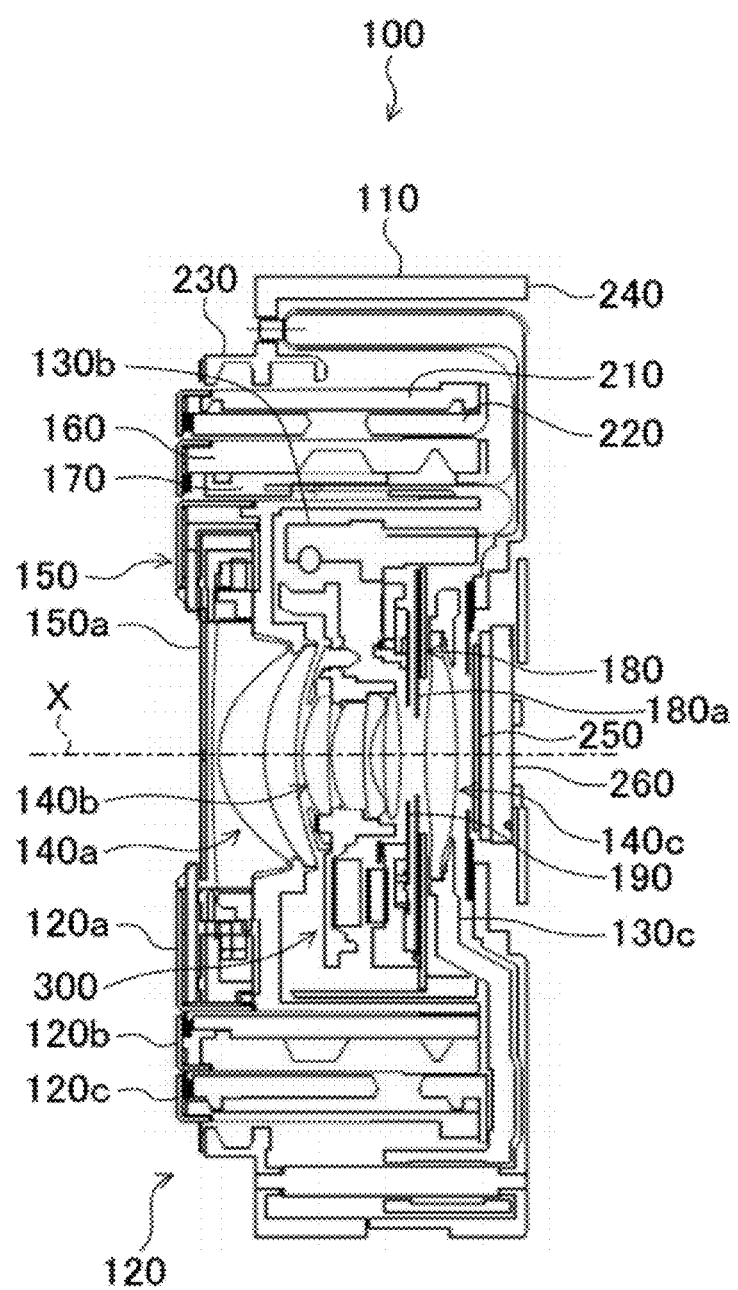
FIG. 3 is a cross-sectional view of the lens barrel in a retracted position.

FIG. 1 is a cross-sectional view of a lens barrel in a wide-angle end (normal shooting position in which a zoom factor is one), FIG. 2 is a cross-sectional view of the lens barrel in a tele end (maximum tele end in which the zoom factor is maximum), and FIG. 3 is a cross-sectional view of the lens barrel in a retracted position (non-shooting position). In the present specification, a term "front" means an object side along an optical axis, and a term "rear" means a camera side along the optical axis. Terms "upper" and "lower" mean upper and lower sides when arranging the lens barrel to shoot a landscape image. Terms "left" and "right" mean left and right sides when arranging the lens barrel to shoot the landscape image and facing an object.

<1. Lens Barrel>
<1-1. Entire Configuration>

A lens barrel 100 of the present embodiment includes a fixed barrel 110, a movable barrel 120 held by the fixed barrel 110 inside the fixed barrel 110, and an image stabilizing device 300. For example, the lens barrel 100 is provided in a digital camera body (not shown in the figure) etc.

The movable barrel 120 includes a first movable barrel 120a, a second movable barrel 120b, and a third movable barrel 120c. The third movable barrel 120c is held by the fixed barrel 110 inside the fixed barrel 110. The second movable barrel 120b is held by the third movable barrel 120c inside the third movable barrel 120c. The first movable barrel 120a is held by the second movable barrel 120b inside the second movable barrel 120b. The third movable barrel 120c extends from fixed barrel 110, the second movable barrel 120b extends from the third movable barrel 120c, and the first movable barrel 120a extends from the second movable barrel 120b. In addition, the third movable barrel 120c is retracted in the fixed barrel 110, the second movable barrel 120b is retracted in the third movable barrel 120c, and the first movable barrel 120a is retracted in the second movable barrel 120b. When extending the first to third movable barrels 120a-120c to the front, the first movable barrel 120a is in a furthermost position from the fixed barrel 110. When retracting the first to third movable barrels 120a-120c, all of the first to third movable barrels 120a-120c are retracted within the fixed barrel 110.

A first lens frame 130a holding a first lens group 140a is provided in the first movable barrel 120a. Specifically, the first lens frame 130a is fixed to the first movable barrel 120a. A second lens frame 130b holding a second lens group 140b is provided in the second movable barrel 120b. Specifically, the second lens frame 130b is held by the second movable barrel 120b so as to move in an optical axis direction. A third lens frame 130c holding a third lens group 140c is provided in the fixed barrel 110. Specifically, the third lens frame 130c is held by the fixed barrel 110 so as to move in the optical axis direction.

Each of the first to third lens groups 140a-140c is configured by combining a plurality of lenses. The first lens group 140a is a lens group for taking an optical image of the object. The second lens group 140b is a lens group for zooming. The third lens group 140c is a lens group for focusing. For shooting, distances between the first lens group 140a and the second lens group 140b and between the second lens group 140b and the third lens group 140c are changed to adjust zoom and focus of the optical image. The first to third lens groups 140a-140c constitute an optical system. The optical system forms the optical image of the object.

<1-2. Configuration of Each Portion>

Next, each portion of the lens barrel will be described in detail.

The first movable barrel 120a includes a barrier unit 150 provided in the front of the first lens group 140a and configured to protect the first lens group 140a. The barrier unit 150 includes an openable blade-like cover 150a opening for shooting and closing for non-shooting. The barrier unit 150 protects the first lens group 140a by the openable blade-like cover 150a.

The second lens frame 130b includes the image stabilizing device 300, a shutter unit 180, and a diaphragm mechanism 190. The image stabilizing device 300 includes the second lens group 140b, and allows the second lens group 140b to move in a plane perpendicular to the optical axis X, thereby correcting an image blur. Specifically, the blur of the optical image is reduced when the lens barrel 100 is moved due to, e.g., a shake of photographer's hands. The diaphragm mechanism 190 is provided in the rear of the second lens group 140b, and adjusts a diaphragm aperture. The shutter unit 180 is provided in the rear of the diaphragm mechanism 190, and opens/closes a shutter 180a. The image stabilizing device 300, the shutter unit 180, the diaphragm mechanism 190, etc. are electrically controlled by a control unit (not shown in the figure) through terminal portions provided in the second lens frame 130b.

The second lens frame 130b includes the image stabilizing device 300, a shutter unit 180, and a diaphragm mechanism 190. The image stabilizing device 300 includes the second lens group 140b, and allows the second lens group 140b to move in a plane perpendicular to the optical axis, thereby correcting an image blur. Specifically, the blur of the optical image is reduced when the lens barrel 100 is moved due to, e.g., a shake of photographer's hands. The diaphragm mechanism 190 is provided in the rear of the second lens group 140b, and adjusts a diaphragm aperture. The shutter unit 180 is provided in the rear of the diaphragm mechanism 190, and opens/closes a shutter 180a. The image stabilizing device 300, the shutter unit 180, the diaphragm mechanism 190, etc. are electrically controlled by a control unit (not shown in the figure) through terminal portions provided in the second lens frame 130b.

The third movable barrel 120c includes a cylindrical drive frame 210 and a cam slot 220 held by the drive frame 210 inside the drive frame 210. The cam slot 220 holds the second movable barrel 120b so that the second movable barrel 120b moves in the optical axis direction inside the cam slot 220.

The fixed barrel 110 includes a cylindrical fixed frame 230 and a cylindrical master flange 240 fixed to the fixed frame 230. The fixed frame 230 holds the third movable barrel 120c and the third lens frame 130c so that the third movable barrel 120c and the third lens frame 130c separately move in the optical axis direction inside the fixed frame 230. A CCD (charge coupled device) unit 260 is provided on the optical axis in a rear end portion of the fixed frame 230. IR (infrared) cut glass 250 for blocking infrared light is provided in the front of the CCD unit 260. Note that the CCD unit 260 is an example of an imaging device configured to receive light, i.e., an optical image and convert the optical image into electrical image signals. The imaging device may be, e.g., a CMOS (complementary metal oxide semiconductor) sensor.

<2. Image Stabilizing Device>
<2-1. Configuration of Each Portion>

Figure 4:
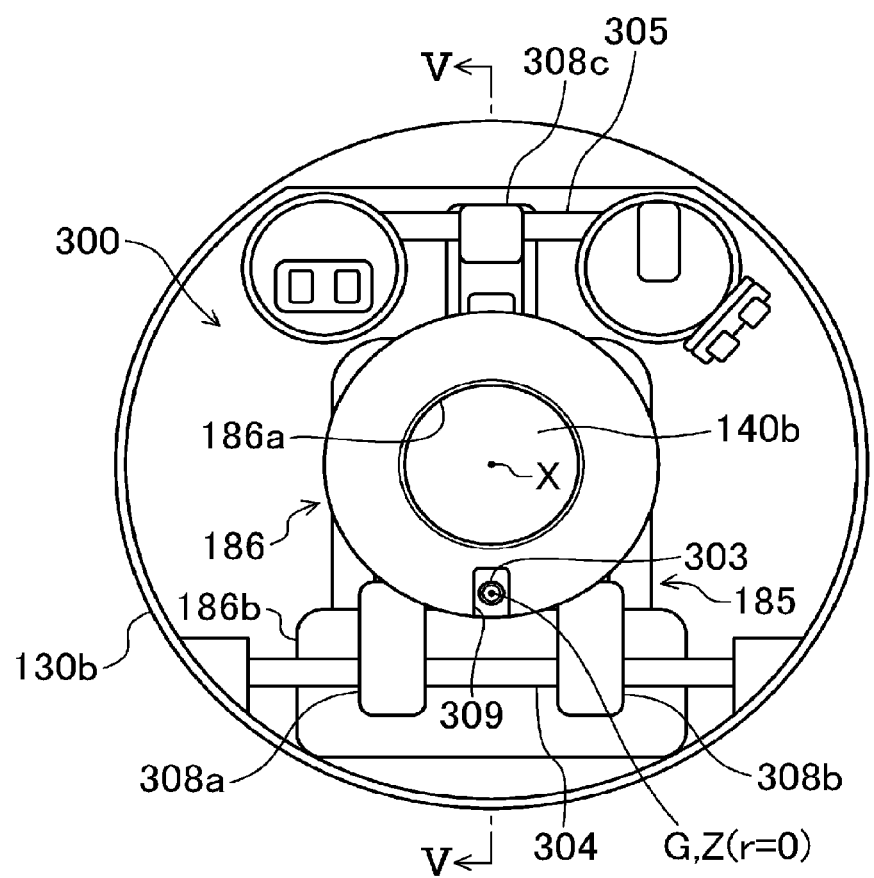
FIG. 4 is a front view of an image stabilizing device.
Figure 5:
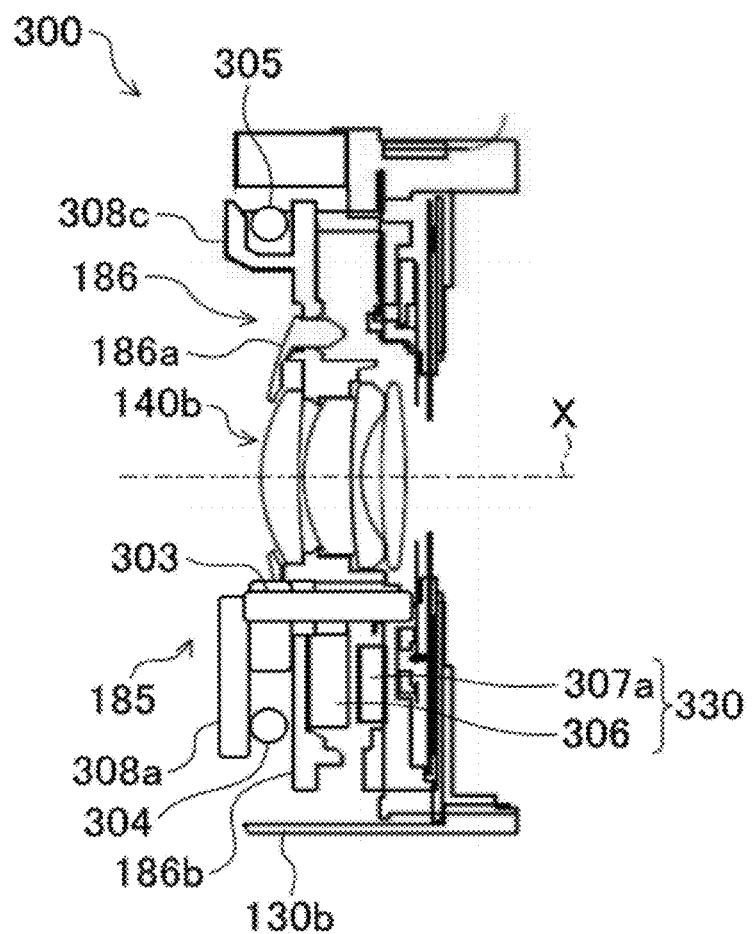
FIG. 5 is a cross-sectional view of the image stabilizing device.
Figure 6:
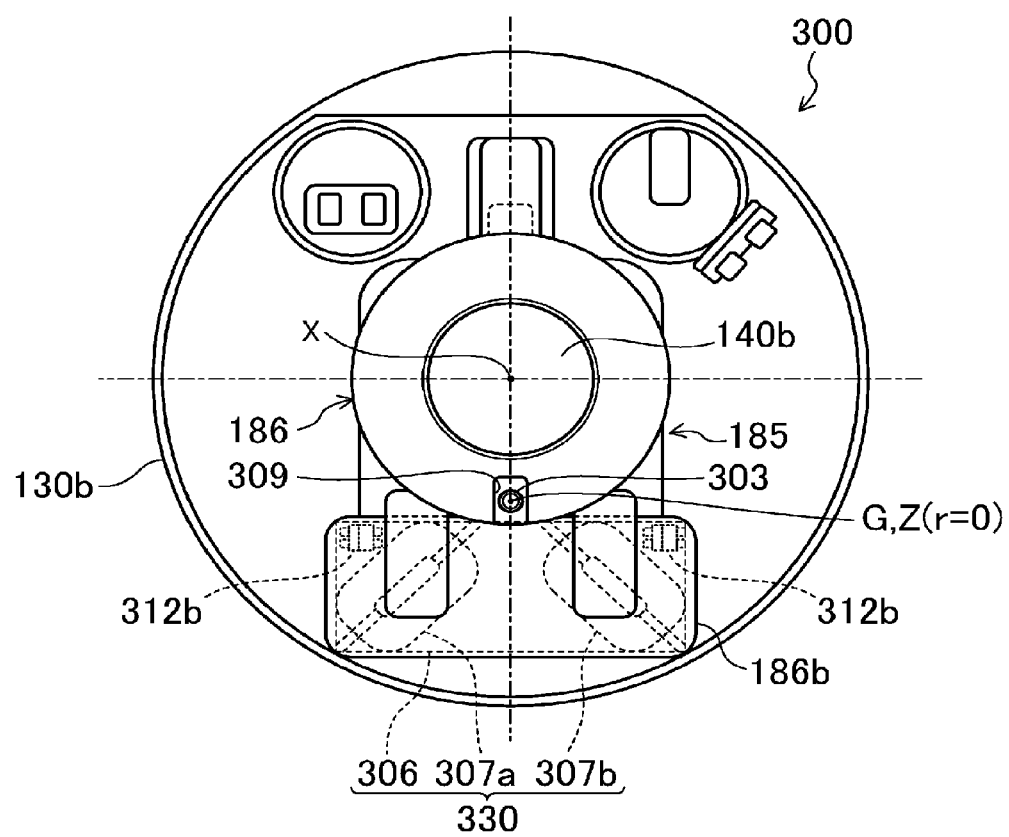
FIG. 6 is a front view of the image stabilizing device in a state in which images of a magnet and electromagnetic coils are projected.
Figure 7:
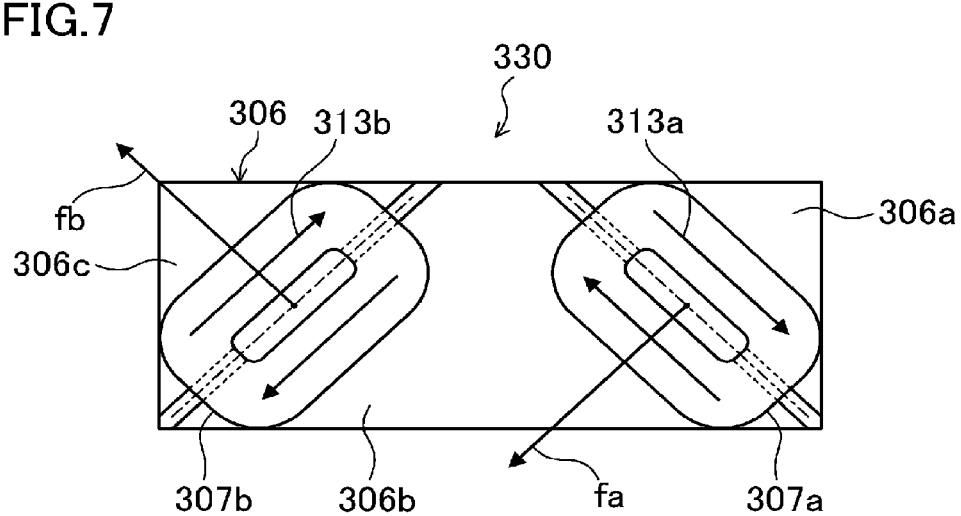
FIG. 7 is a back view of an actuator.
Figure 8A:
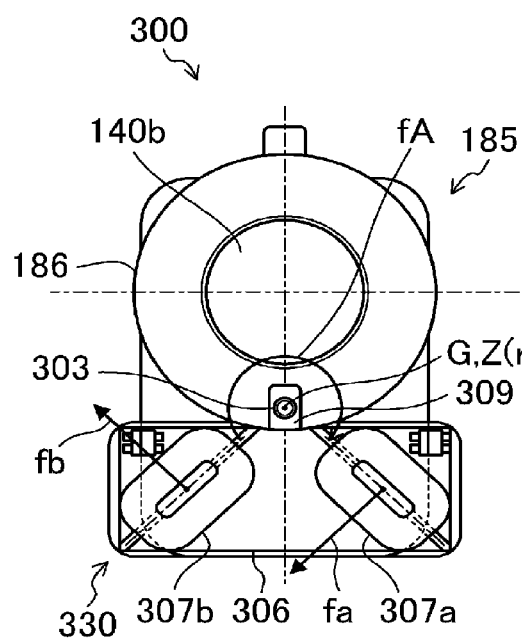
FIG. 8(A) is a schematic view when generating rotational thrust on a lens unit.
Figure 8B:
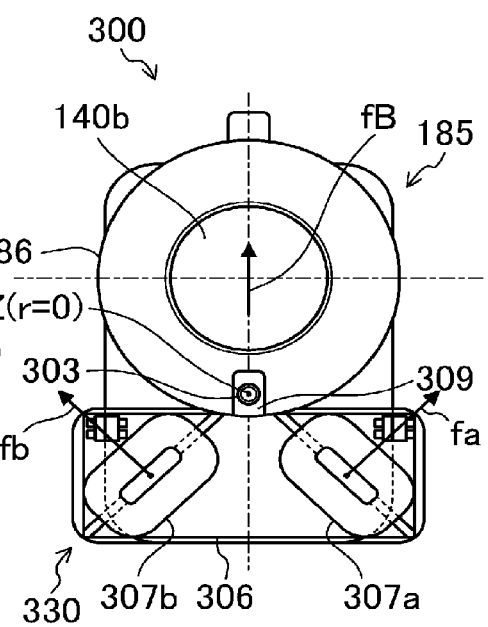
FIG. 8(B) is a schematic view when generating translational thrust on the lens unit.

Next, a configuration of the image stabilizing device 300 will be described in detail. FIG. 4 is a front view of an image stabilizing device, and FIG. 5 is a cross-sectional view of the image stabilizing device. FIG. 6 is a front view of the image stabilizing device in a state in which images of a magnet and electromagnetic coils are projected. FIG. 7 is a back view of an actuator. FIG. 8(A) is a schematic view when generating rotational thrust on a lens unit, and FIG. 8(B) is a schematic view when generating translational thrust on the lens unit. Note that FIGS. 8(A) and 8(B) correspond to the back view, and are views from a side opposite to FIG. 6.

The image stabilizing device 300 includes a lens unit 185 having the second lens group 140b, and electromagnetic coils 307a, 307b. The image stabilizing device 300 forms a lens drive mechanism.

The lens unit 185 is supported by the second lens frame 130b through first and second slide poles 304, 305 provided in the second lens frame 130b. The first slide pole 304 is provided in a lower part of the second lens frame 130b so as to extend in a horizontal direction. The second slide pole 305 is provided in an upper part of the second lens frame 130b so as to extend parallel to the first slide pole 304 (i.e., extend in the horizontal direction).

Specifically, the lens unit 185 includes the second lens group 140b, a frame body 186 holding the second lens group 140b, first and second engagement portions 308a, 308b to be engaged with the first slide pole 304, a third engagement portion 308c to be engaged with the second slide pole 305, and a magnet 306. The lens unit 185 forms a movable member including the second lens group 140b as lenses.

The frame body 186 includes a circular opening 186a and a square flat plate portion 186b provided below the opening 186a. The magnet 306 is attached to a rear surface (surface on a side opposite to the first and second engagement portions 308a, 308b) of the flat plate portion 186b. As will be described in detail later, the magnet 306 and the electromagnetic coils 307a, 307b together form an actuator 330.

The first and second engagement portions 308a, 308b are provided in the front of the flat plate portion 186b so as to face the flat plate portion 186b. Each of the first and second engagement portions 308a, 308b and the flat plate portion 186b are spaced from each other in the optical axis direction, and such a space is slightly larger than an outer diameter of the first slide pole 304. The first and second engagement portions 308a, 308b are provided so as to be spaced from each other in the horizontal direction. The third engagement portion 308c vertically and upwardly extends from an upper end of the frame body 186, and a tip end part of the third engagement portion 308c branches into two portions. The two tip end parts of the third engagement portion 308c face each other with a space in the optical axis direction. Such a space is slightly larger than an outer diameter of the second slide pole 305.

In the lens unit 185 configured as in the foregoing, the first slide pole 304 is slidably engaged between each of the first and second engagement portions 308a, 308b and the flat plate portion 186b, and the second slide pole 305 is slidably engaged with the third engagement portion 308c. Consequently, in a state in which displacement of the lens unit 185 in the optical axis direction is restricted, the lens unit 185 is supported by the second lens frame 130b so as to move in the plane perpendicular to the optical axis.

A guide pin 303 extending in the optical axis direction is provided in the second lens frame 130b. On the other hand, in the lens unit 185, a long-hole-like guide groove 309 is formed below the opening 186a and in an upper end part of the flat plate portion 186b. A position of the guide groove 309 in the horizontal direction is on the center of the second lens group 140b. The guide groove 309 extends in a radial direction about the optical axis (i.e., toward the center of the second lens group 140b). The guide pin 303 is engaged with the guide groove 309. Thus, the lens unit 185 is supported by the second lens frame 130b so as to translationally move along a longitudinal direction of the guide groove 309 and rotate in a circumferential direction about the guide pin 303 (a rotational axis Z). The guide pin 303 and the guide groove 309 form a guide portion.

The electromagnetic coils 307a, 307b and the magnet 306 attached to the lens unit 185 together form the actuator 330.

The magnet 306 is formed in rectangular plate-like shape. The magnet 306 is divided into three portions which are different from each other in magnetism. Specifically, the magnet 306 is divided into two right triangular corner portions 306a, 306c containing two upper corners, and a remaining trapezoidal portion 306b. The corner portions 306a, 306c have the same magnetic pole (north pole), and the trapezoidal portion 306b has a magnetic pole opposite to that of the corner portions 306a, 306c (south pole). The electromagnetic coils 307a, 307b are wound in long hole shape. The electromagnetic coils 307a, 307b are attached to the second lens frame 130b in a position facing the magnet 306. In such a state, the electromagnetic coils 307a, 307b are arranged so that a long axis (axis passing through the center of the long hole and extending in a longitudinal direction of the long hole) extends along a boundary between each of the corner portions 306a, 306c and the trapezoidal portion 306b on the magnet 306. In other words, the electromagnetic coils 307a, 307b are arranged so that upper ends of the electromagnetic coils 307a, 307b approach each other, and lower ends of the electromagnetic coils 307a, 307b are apart from each other. In the present embodiment, the electromagnetic coil 307a and the corner portion 306a and the trapezoidal portion 306b of the magnet 306 form a single drive portion, and the electromagnetic coil 307b and the corner portion 306c and the trapezoidal portion 306b of the magnet 306 form another drive portion.

In the actuator 330 configured as in the foregoing, drive current 313a, 313b is applied to the electromagnetic coils 307a, 307b to generate thrust. Specifically, when applying the drive current 313a, 313b to the electromagnetic coils 307a, 307b, Lorentz force is generated due to magnetic flux generated from the magnet 306. Since the electromagnetic coils 307a, 307b are fixed to the second lens frame 130b, reaction force of the generated Lorentz force acts on the lens unit 185 as primary thrust fa, fb. Directions of the primary thrust fa, fb are changed depending on directions of the drive current 313a, 313b applied to the electromagnetic coils 307a, 307b.

Specifically, when applying the drive current 313a, 313b to the electromagnetic coils 307a, 307b in a clockwise direction as viewed in FIG. 7, the primary thrust fb directing from the trapezoidal portion 306b to the upper left corner portion 306c is generated near the boundary between the corner portion 306c and the trapezoidal portion 306b in the magnet 306, whereas the primary thrust fa directing from the upper right corner portion 306a to the trapezoidal portion 306b is generated near the boundary between the corner portion 306a and the trapezoidal portion 306b in the magnet 306 as illustrated in FIG. 8(A). Consequently, rotational thrust fA rotating the lens unit 185 about the guide pin 303 in the clockwise direction is generated as resultant force of the primary thrust fa, fb. Note that, when applying the drive current 313a, 313b to the electromagnetic coils 307a, 307b respectively in a counter-clockwise direction, the rotational thrust fA rotating the lens unit 185 about the guide pin 303 in the counter-clockwise direction is generated.

On the other hand, when applying the drive current 313a to the electromagnetic coil 307a in the clockwise direction as viewed in FIG. 7, and applying the drive current 313b to the electromagnetic coil 307b in the counter-clockwise direction as viewed in FIG. 7, the primary thrust fb directing from the trapezoidal portion 306b to the upper left corner portion 306c is generated near the boundary between the corner portion 306c and the trapezoidal portion 306b in the magnet 306, whereas the primary thrust fa directing from the trapezoidal portion 306b to the upper right corner portion 306a is generated near the boundary between the corner portion 306a and the trapezoidal portion 306b as illustrated in FIG. 8(B). Consequently, translational thrust fB upwardly and translationally moving the lens unit 185 along the longitudinal direction of the guide groove 309 is generated as resultant force of the primary thrust fa, fb. Note that, when applying the drive current 313a to the electromagnetic coil 307a in the counterclockwise direction, and applying the drive current 313b to the electromagnetic coil 307b in the clockwise direction, the translational thrust fB downwardly and translationally moving the lens unit 185 along the guide groove 309.

The primary thrust fa, fb is calculated based on the following expressions:

$$fa = \alpha a \times (fA + \beta a \times fB) \quad (1)$$

$$fb = \alpha b \times (fB - \beta b \times fB) \quad (2)$$

where "fA" represents rotational thrust, "fB" represents translational thrust, "αa" represents a first conversion factor of "fa," "βa" represents a second conversion factor of "fa," "αb" represents a first conversion factor of "fb," and "βb" represents a second conversion factor of "fb."

If geometric and electromagnetic symmetry of, e.g., the magnet 306 and the electromagnetic coils 307a, 307b can be realized as expected, the first conversion factor αa of the primary thrust fa is equal to the first conversion factor αb of the primary thrust fb, and the second conversion factor βa of the primary thrust fa is equal to the second conversion factor βb of the primary thrust fb. However, an error is caused in an actual product. Thus, such conversion factors are not equal to each other, and are adjusted and set as necessary.

The guide groove 309 is formed so as to pass through the gravity center G of the lens unit 185. If the magnet 306 is not provided in the lens unit 185, only the second lens group 140b is a heavy component in the lens unit 185. Thus, the gravity center G of the lens unit 185 is on the gravity center of the second lens group 140b, or is positioned near the gravity center of the second lens group 140b. On the other hand, in the present embodiment, the magnet 306 which is a heavy component is attached to the lens unit 185 in addition to the second lens group 140b, and therefore the gravity center G of the lens unit 185 is positioned between the second lens group 140b and the magnet 306. In the lens unit 185 configured as in the foregoing, the guide groove 309 is arranged so as to pass through the gravity center G of the lens unit 185.

More specifically, the gravity center G of the lens unit 185 is positioned at a middle point of the guide groove 309 in the longitudinal direction. The middle point of the guide groove 309 in the longitudinal direction corresponds to a position of the guide pin 303 when a center axis of the second lens group 140b is on the center axis of the lens barrel 100. That is, when an optical axis of the second lens group 140b is coincident with an optical axis of the optical system, the guide pin 303 is positioned at a middle point of a movable area of the guide groove 309, and is positioned on the gravity center G of the lens unit 185. The middle point of the guide groove 309 in the longitudinal direction, i.e., the middle point of the movable area of the guide groove 309 is hereinafter referred to as a "reference position." When the image blur is not corrected, the guide pin 303 is in the reference position of the guide groove 309, and the optical axis of the second lens group 140b is coincident with the optical axis of the lens barrel 100.

<2-2. Detection of Position of Lens Unit>

Figure 9A:
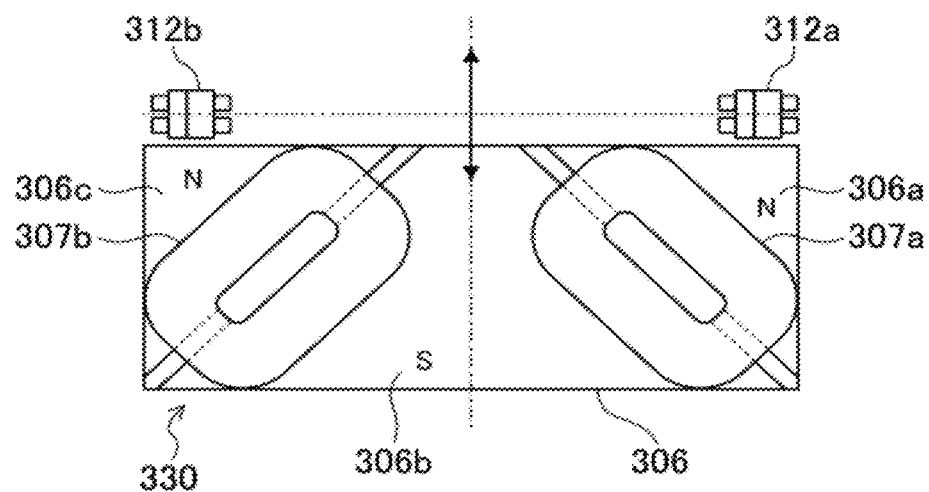
FIG. 9(A) is a schematic view illustrating a position detecting method by hall sensors when the actuator translationally moves.
Figure 9B:
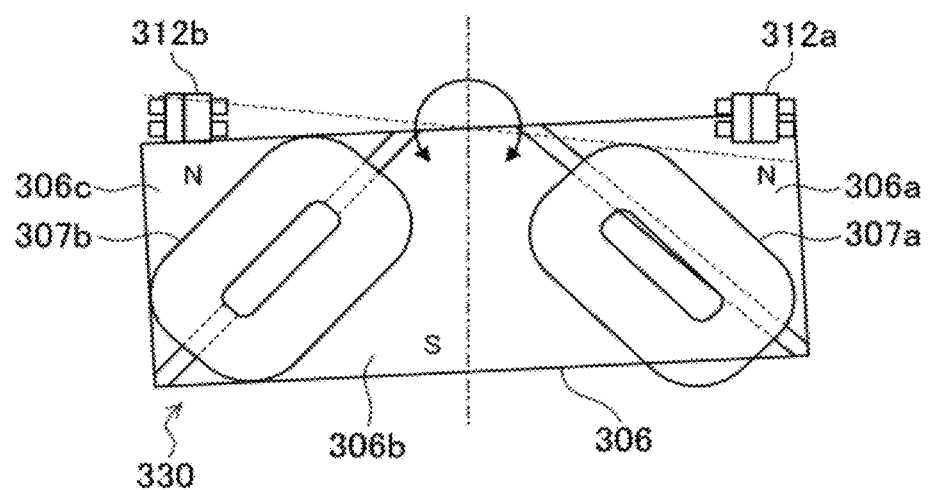
FIG. 9(B) is a schematic view illustrating a position detecting method by the hall sensors when the actuator rotates.

Hall sensors 312a, 312b are provided in positions of the second lens frame 130b, which face the upper left corner portion and the upper right corner portion of the magnet 306. The hall sensors 312a, 312b output voltage proportional to interlinkage magnetic flux density. FIGS. 9(A) and 9(B) are schematic views of the actuator, which illustrate a position detecting method by the hall sensors.

When, e.g., a magnet 306 illustrated in FIG. 9(A) upwardly and translationally moves in the vertical direction so that an upper edge of the magnet 306 is on a dashed line, the magnet 306 approaches the hall sensors 312a, 312b. Consequently, magnetic flux linkage densities in the hall sensors 312a, 312b are increased, thereby increasing output voltages of both of the hall sensors 312a, 312b. On the other hand, when the magnet 306 downwardly moves in the vertical direction, the magnet 306 is apart from the hall sensors 312a, 312b. Consequently, the magnetic flux linkage densities in the hall sensors 312a, 312b are decreased, thereby decreasing the output voltages of both of the hall sensors 312a, 312b. Thus, the sum of the output voltages of both of the hall sensors 312a, 312b is proportional to a moving distance of the magnet 306 in the vertical direction.

On the other hand, when a magnet 306 illustrated in FIG. 9(B) rotates in the clockwise direction so that an upper edge of the magnet 306 is on a dashed line, the upper right corner portion 306a of the magnet 306 approaches the hall sensor 312a, and the upper left corner portion 306c of the magnet 306 is apart from the hall sensor 312b. Consequently, the output voltage of the hall sensor 312a is increased, whereas the output voltage of the hall sensor 312b is decreased. When the magnet 306 rotates in the counter-clockwise direction, the increase/decrease in output voltage is reversed between the hall sensors 312a, 312b. Thus, a difference between the output voltages of the hall sensors 312a, 312b is proportional to a moving distance of the magnet 306 in the rotation direction.

A position signal pA of the lens unit 185 in the translational direction and a position signal pB of the lens unit 185 in the rotation direction can be obtained based on the following expressions by using the output voltages of the hall sensors 312a, 312b:

$$pA = \gamma A \times (ha + hb) \quad (3)$$

$$pB = \gamma B \times (ha - hb) \quad (4)$$

where "ha" represents output voltage of the hall sensor 312a, "hb" represents output voltage of the hall sensor 312b, "γA" represents a conversion factor of "pA," and "γB" represents a conversion factor of "pB."

If hall output sensitivity of the hall sensors 312a, 312b, and geometric and electromagnetic symmetry of, e.g., the magnet 306 can be realized as expected, the conversion factor γA of the position signal pA is equal to the conversion factor γB of the position signal pB. However, an error is caused in an actual product. Thus, such conversion factors are not equal to each other, and are adjusted and set as necessary.

<2-3. Control of Image Stabilizing Device>

FIG. 10 is a block diagram of a control unit of the image stabilizing device 300. The control unit of the image stabilizing device 300 includes a PID (proportional-integral-derivative) compensator 404, a thrust distributor 407, and a position separator 409. A target position 402 calculated depending on movement of the lens barrel 100 is inputted to the image stabilizing device 300 to execute the following control loop 400, and therefore the image stabilizing device 300 is controlled so that the lens unit 185 is moved to the target position 402.

The position separator 409 obtains the position signal pA in the translational direction and the position signal pB in the rotation direction based on the expressions (3) and (4) by using output voltages 408 of the hall sensors 312a, 312b, and then outputs such signals as a current position 403 of the lens unit 185. The current position 403 is subtracted from the target position 402, and a position error 405 which is a difference between the current position 403 and the target position 402 is inputted to the PID compensator 404. The PID compensator 404 multiplies the position error 405 by a factor stabilizing the control loop 400, and then outputs the rotational thrust fA and the translational thrust fB to the thrust distributor 407 as a drive command 406. Based on the expressions (1) and (2), the thrust distributor 407 distributes the rotational thrust fA and the translational thrust fB to the primary thrust fa, fb generated by the electromagnetic coils 307a, 307b. The drive current 313a, 313b corresponding to the primary thrust fa, fb is supplied to the electromagnetic coils 307a, 307b. In such a manner, the lens unit 185 is driven and moved to the target position 402. Subsequently, the position separator 409 outputs the current position 403 of the lens unit 185, and the control loop 400 is repeated.

Figure 11:
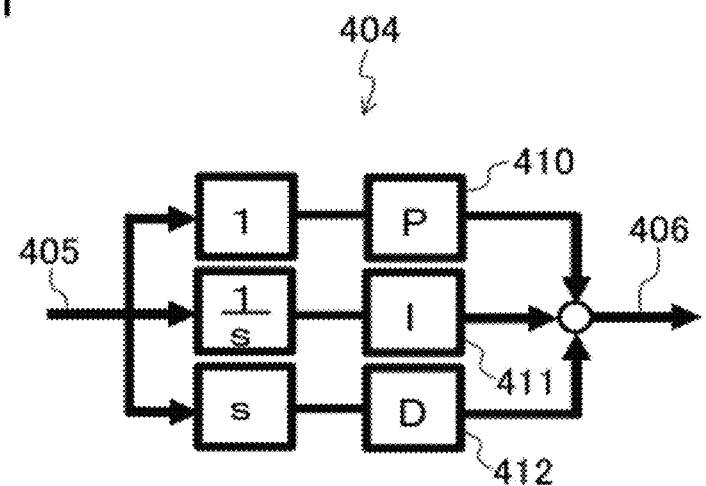
FIG. 11 is a block diagram of a PID compensator.

FIG. 11 is a block diagram of the PID compensator 404. The PID compensator 404 includes a proportional section 410, an integral section 411, and a derivative section 412. The PID compensator 404 multiplies the position error 405 by a predetermined factor, thereby stabilizing the entire control loop 400.

Figure 12:
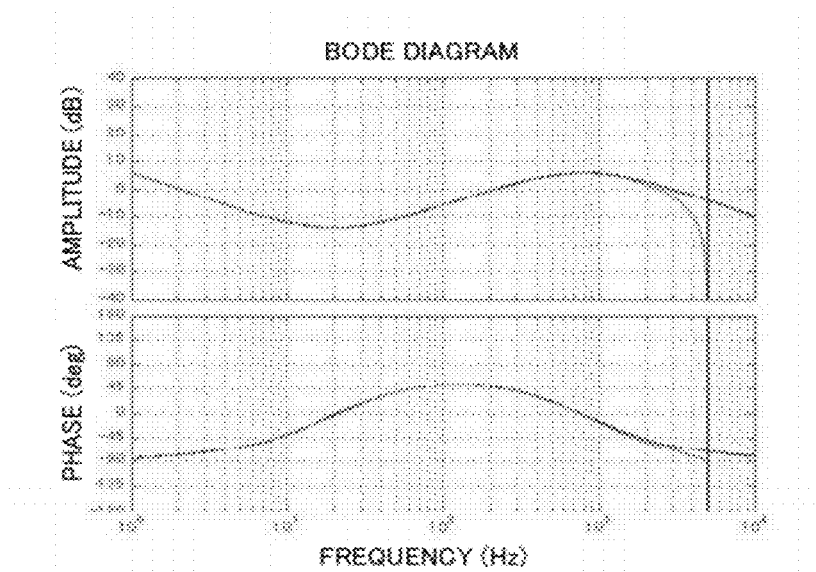
FIG. 12 illustrates frequency properties of the PID compensator.

FIG. 12 illustrates frequency properties of the PID compensator 404. FIG. 12 illustrates gain of the rotational thrust fA and the translational thrust fB which are output, to the position error 405 which is input; and phase properties. With reference to this figure, factors in the proportional section 410, the integral section 411, and the derivative section 412 are determined.

<3. Advantages of First Embodiment>

According to the present embodiment, the guide pin 303, i.e., the rotation center of the lens unit 185 is positioned near the gravity center G of the lens unit 185, thereby reducing the centrifugal force or the Coriolis force generated in the lens unit 185. In addition to the foregoing, inertia moment of the lens unit 185 about the guide pin 303 can be decreased. Consequently, the lens unit 185 can be easily driven as desired, thereby improving the controllability of the lens unit 185.

The center of the rotational thrust fA is positioned near the gravity center G of the lens unit 185, and a line of action of the translational thrust fB passes through the gravity center G of the lens unit 185 or passes near the gravity center G. Thus, a coupled component is weakened, which is generated between the rotation and the translation and interferes with the rotation and the translation of the lens unit 185. This also improves the controllability of the movable member.

The actuator 330 allows the rotational thrust fA and the translational thrust fB to act on the lens unit 185 by the single magnet 306 and the two electromagnetic coils 307a, 307b. Thus, the size and cost of the image stabilizing device 300 can be reduced.

The actuator 330 as in the foregoing is employed, and therefore the gravity center G of the lens unit 185 can be offset from the center of the second lens group 140b to the actuator 330. In such a manner, the guide groove 309 can be arranged near the gravity center G of the lens unit 185 or on the gravity center G. That is, if the gravity center G of the lens unit 185 is in an area within an effective diameter of the second lens group 140b, it is difficult to arrange the guide groove 309 near the gravity center G of the lens unit 185 because any components cannot be arranged in the front or rear of the second lens group 140b. On the other hand, since the actuator 330 is provided, the gravity center G of the lens unit 185 is positioned outside the effective diameter of the second lens group 140b. Thus, the guide groove 309 can be arranged near the gravity center G of the lens unit 185.

When the lens unit 185 is in the reference position, the gravity center G of the lens unit 185 is preferably set so that a distance r between the gravity center G and the guide pin 303 satisfies the following expression (A):

$$r \leq \sqrt{0.2J/M} \tag{A}$$

where "J" represents inertia moment about the gravity center of the lens unit 185, and "M" represents mass of the lens unit 185.

That is, if a rotational axis is displaced from the gravity center G by the distance r, the inertia moment of the lens unit 185 about the rotational axis is $J+Mr^2$. As compared to a case where the rotational axis passes through the gravity center G, an increase in inertia moment is represented by "$Mr^2$." Even if the rotational axis is displaced from the gravity center G, the increase in inertia moment preferably falls below about 20% considering the controllability of the lens unit 185. That is, the following expression is satisfied:

$$Mr^2 \leq 0.2J \tag{5}$$

Consequently, the distance r between the rotational axis and the gravity center G is as in the expression (A).

Regarding one example of the lens unit 185, when the inertia moment J about the gravity center and the mass M are substituted into the expression (A), r≦2.58 mm.

Figure 13:
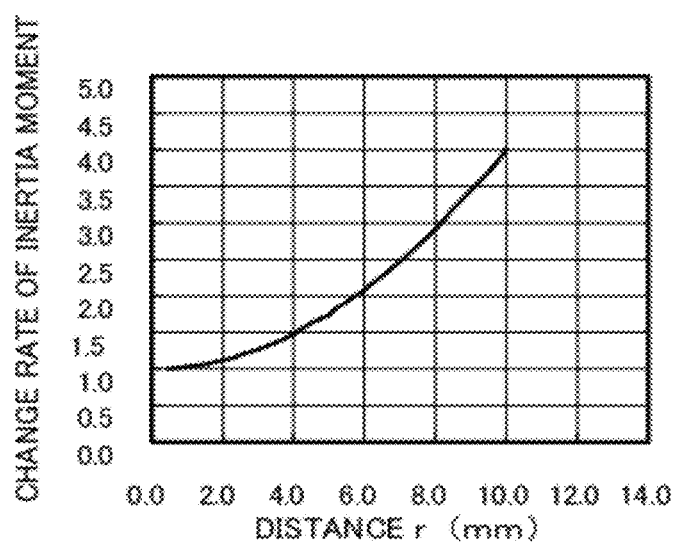
FIG. 13 is a graph illustrating a change rate of inertia moment with respect to a distance r from a rotational axis to a gravity center.

FIG. 13 illustrates results of the one example, which show a change rate of the inertia moment with respect to the distance r between the rotational axis to the gravity center G. The change rate of the inertia moment is changed as the square of the distance r, and therefore the change rate is significantly increased after the change rate exceeds about 1.2 (i.e., about 20%). Thus, as will be seen from FIG. 13, the increase in inertia moment can be reduced by satisfying the expression (A).

The lens unit 185 rotates while moving along the guide groove 309. The lens unit 185 is often rotatably driven near the middle point (i.e., reference position) of the guide groove 309 on the average. Thus, the lens unit 185 is configured so as to satisfy the expression (A) when the lens unit 185 is in the reference position, thereby averagely reducing the increase in inertia moment of the lens unit 185.

Further, in an entire area where the lens unit 185 moves along the guide groove 309, the lens unit 185 is preferably configured so as to satisfy the expression (A). This constantly reduces the increase in inertia moment of the lens unit 185 to equal to or less than about 20%.

Second Embodiment

Figure 14:
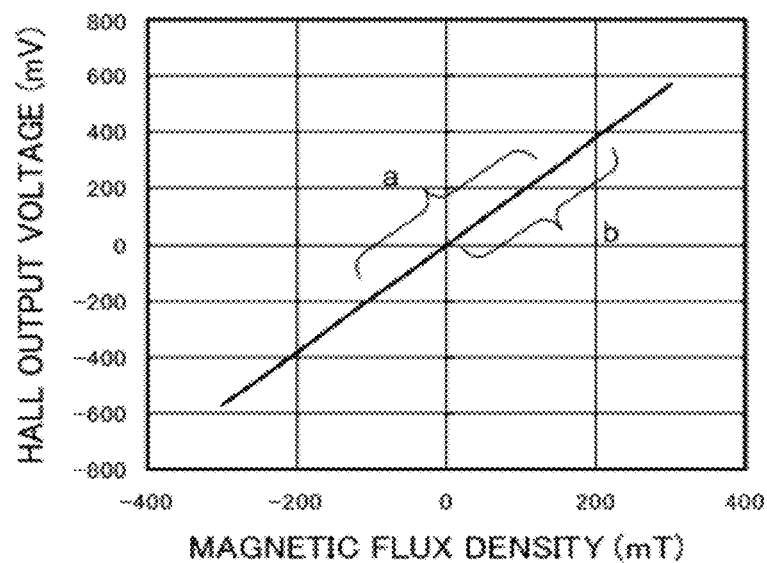
FIG. 14 is a graph illustrating a relationship between magnetic flux density of the hall sensor and output voltage.

Next, a second embodiment will be described. FIG. 14 is a graph illustrating a relationship between magnetic flux density of a hall sensor and output voltage. A typical hall sensor has sensitivity to both of positive and negative magnetic flux densities. As illustrated in FIG. 14, there is a linear portion a representing linear sensitivity suitable for a position sensor in a range containing positive and negative values around a magnetic flux density value of 0 (zero). However, in the first embodiment, the hall sensors 312a, 312b detect the increase/decrease in magnetic flux from the corner portions 306a, 306c which are the north pole of the magnet 306, and therefore a position is detected only in a portion b of the linear portion a, in which the magnetic flux density value is positive. The second embodiment is different from the first embodiment in that a position is detected in the entire linear portion a. Specifically, the second embodiment is different from the first embodiment in a magnet configuration. The same reference numerals as those in the first embodiment are used to represent equivalent elements, and the description thereof will not be repeated. Different configurations between the first and second embodiments will be mainly described.

Figure 15A:
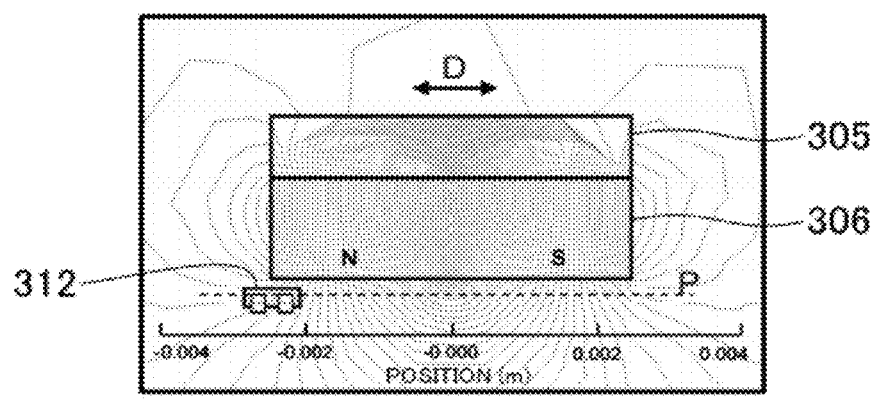
FIG. 15(A) illustrates arrangement of the magnet and the hall sensor, and magnetic flux distribution in a first embodiment.
Figure 15B:
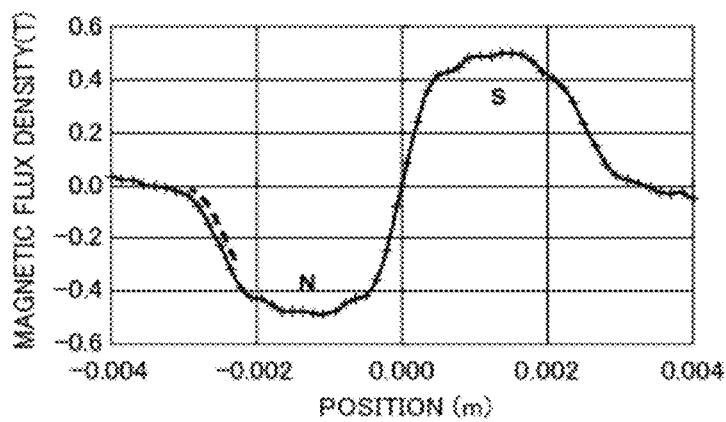
FIG. 15(B) is a magnetic flux graph illustrating magnetic flux density (normal component) measured by the hall sensor in the first embodiment.
Figure 16A:
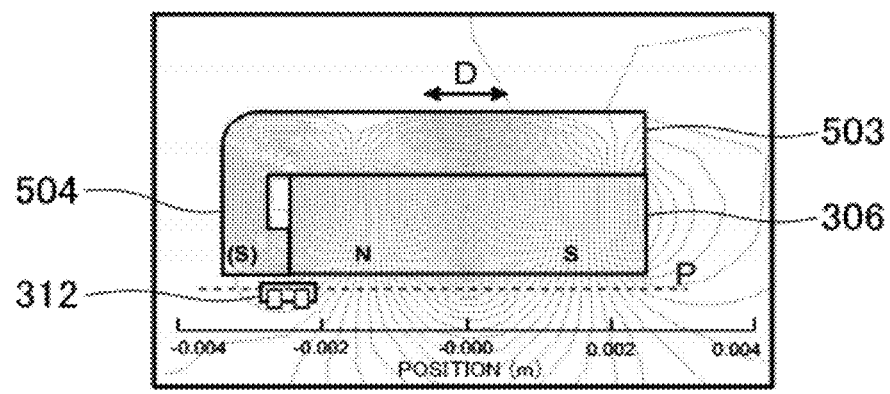
FIG. 16(A) illustrates arrangement of a magnet and a hall sensor, and magnetic flux distribution in a second embodiment.
Figure 16B:
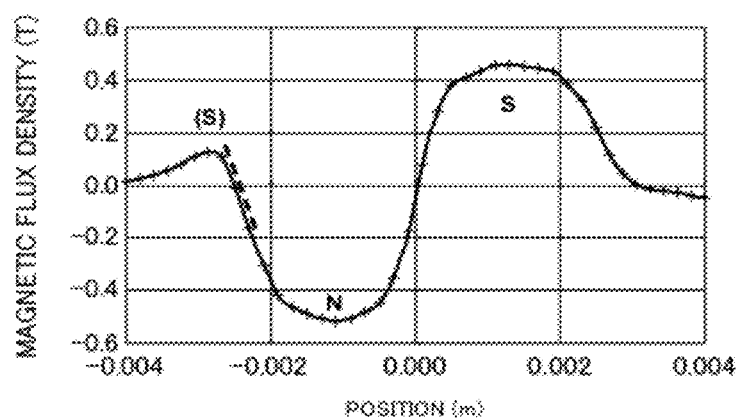
FIG. 16(B) is a magnetic flux graph illustrating magnetic flux density (normal component) measured by the hall sensor in the second embodiment.

FIG. 15(A) illustrates arrangement of the magnet and the hall sensor, and magnetic flux distribution in the first embodiment; and FIG. 15(B) is a graph illustrating magnetic flux density (normal component) measured by the hall sensor in the first embodiment. In addition, FIG. 16(A) illustrates arrangement of a magnet and a hall sensor, and magnetic flux distribution in the second embodiment; and FIG. 16(B) is a graph illustrating magnetic flux density (normal component) measured by the hall sensor in the second embodiment. Dashed lines P in FIGS. 15(A) and 16(A) are lines at which a distance between the hall sensor and the magnet is constant. A negative-value side of a position in FIGS. 15(A) and 16(A) corresponds to an upper side in FIG. 5. When the magnet moves with movement of a lens unit 185, the magnet moves along the dashed line P. That is, the hall sensor relatively moves on the dashed line P relative to the magnet. Note that a reference numeral "502" represents a back yoke provided in a surface of the magnet 306, which is on a side opposite to a hall sensor 312 (hereinafter referred to as a "back surface").

When correcting an image blur, the hall sensor relatively moves within an area of −0.003−−0.002 m. In the magnet 306 of the first embodiment, magnetic flux from a left corner portion close to the hall sensor 312 in FIG. 15(A) is diverged and distributed. Thus, a change in magnetic flux density in a position of the hall sensor 312 is changed only on the negative-value side as indicated by a dashed line in FIG. 15(B). In particular, the change in magnetic flux density defines a curved line around −0.003 m, i.e., in an area where the hall sensor 312 and the magnet 306 are apart from each other. Consequently, position detection capability of the hall sensor 312 is low.

On the other hand, the back yoke 503 is provided on the magnet 306 of the second embodiment. The back yoke 503 is provided on the back surface of the magnet 306. The back yoke 503 includes a bent portion 504 bending and extending from the back surface of the magnet 306 to the left as viewed in FIG. 16(A) (upper side as viewed in FIG. 5). The bent portion 504 adjoins the north pole of the magnet 306, and therefore a commutating pole (south pole) is locally generated in the bent portion 504. Thus, the magnetic flux density of the magnet 306 within an area of −0.003−−0.002 m linearly changes and passes a value of 0 (zero) as indicated by a dashed line in FIG. 16(B). Consequently, the position detection capability of the hall sensor 312 is improved.

Other Embodiments

The foregoing embodiments may have the following configurations.

Figure 17:
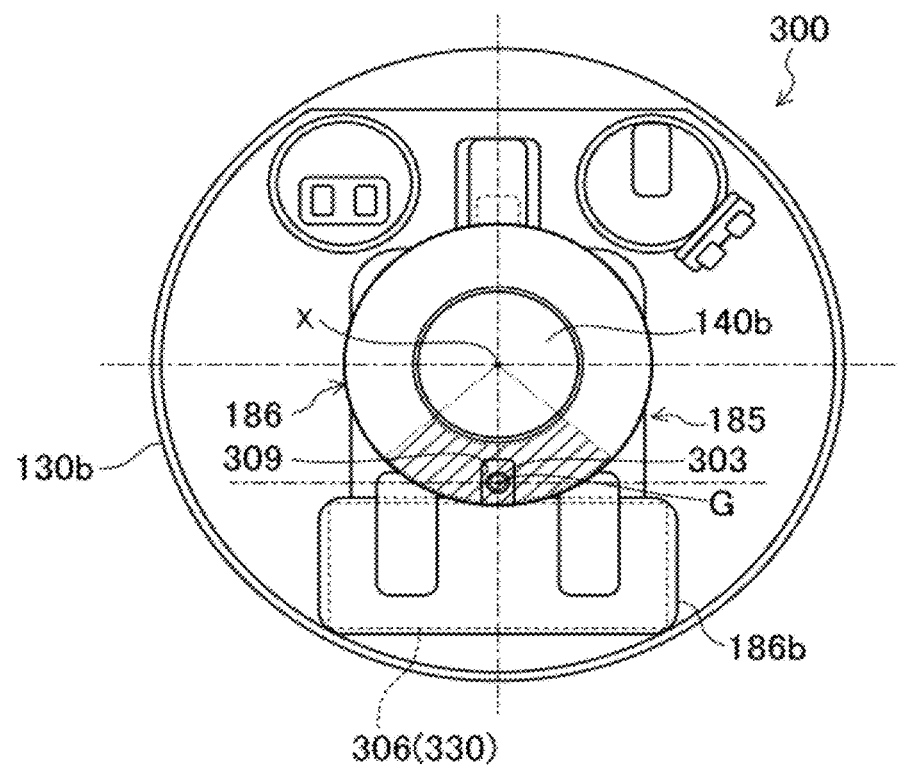
FIG. 17 is a view illustrating an area where a guide pin can be arranged.

In the foregoing embodiments, the guide pin 303 when the lens unit 185 is in the reference position (hereinafter referred to as a "guide pin 303 in reference position") is on the gravity center G of the lens unit 185, but the present disclosure is not limited to such a configuration. As illustrated in, e.g., FIG. 17, the guide pin 303 in reference position may be within an arc belt-shaped region around an optical axis, which is positioned outside an effective diameter (region of a lens surface, where light from an object transmits) of a second lens group 140b and positioned inside an actuator 330 (magnet 306 in the present embodiment). This allows the gravity center G of the lens unit 185 to be positioned near the guide pin 303, thereby improving the controllability of the lens unit 185.

That is, a lens drive unit includes a movable member having lenses; a guide portion configured to movably guide the movable member back and forth along a predetermined direction and rotatably guide the movable member about a predetermined rotational axis in a plane perpendicular to an optical axis of the lens; and two drive portions configured to drive the movable member. The two drive portions are arranged on a side opposite to the optical axis relative to the rotational axis. The rotational axis is positioned between the lens and each of the two drive portions. This allows the rotational axis to be arranged near the gravity center of the movable member, thereby improving controllability of the movable member.

Further, the guide pin 303 in reference position is more preferably positioned within the arc belt-shaped region and is positioned within a minimum sector region around the optical axis, which contains the actuator 330. This allows the gravity center G of the lens unit 185 to be positioned near the guide pin 303, thereby improving the controllability of the lens unit 185.

In the foregoing description, the position of the guide pin 303 in reference position is specified, but the guide groove 309 may be positioned within the arc belt-shaped region. Further, the guide groove 309 may be positioned within the arc belt-shaped region and the sector region. This also allows the gravity center G of the lens unit 185 to be positioned near the guide pin 303, thereby improving the controllability of the lens unit 185.

The guide pin 303 in reference position may be positioned within a region where the distance r between the guide pin 303 in reference position and the gravity center G of the lens unit 185 satisfies the expression (A). Further, in the entire area where the lens unit 185 moves along the guide groove 309, the guide pin 303 may be positioned within a region where the distance r between the guide pin 303 and the gravity center G of the lens unit 185 satisfies the expression (A).

The configuration of the lens unit 185 is one example, and the present disclosure is not limited to such a configuration. For example, the support structure of the lens unit 185 by the second lens frame 130b is not limited to those of the foregoing embodiments.

In the foregoing embodiments, the single magnet 306 is provided for the two electromagnetic coils 307a, 307b, but the present disclosure is not limited to such a configuration. A magnet may be provided for each of the two electromagnetic coils 307a, 307b.

In the foregoing embodiment, the magnet 306 is provided on the lens unit 185, and the electromagnetic coils 307a, 307b are provided on the second lens frame 130b. However, the present disclosure is not limited to such a configuration. The electromagnetic coils 307a, 307b may be provided on the lens unit 185, and the magnet 306 may be provided on the second lens frame 130b. Note, however, that wires for power supply are needed for the electromagnetic coils 307a, 307b, and the lens unit 185 is the movable member. Thus, considering wiring, the electromagnetic coils 307a, 307b are preferably provided in the lens unit 185.

The actuator 330 of the lens unit 185 is not limited to the configuration of the magnet 306 and the electromagnetic coils 307a, 307b. As long as the lens unit 185 can translationally move and rotate, any actuators may be employed.

A distance from the rotational axis to one of the actuators (drive portions) is preferably equal to or shorter than twice a distance from the rotational axis to the other actuator (drive portion). It is preferable that the two actuators and the rotational axis are not arranged in line.

In the foregoing embodiment, the guide groove 309 is provided in the lens unit 185, and the guide pin 303 is provided in the second lens frame 130b. However, the present disclosure is not limited to such a configuration. For example, the guide pin 303 may be provided in the lens unit 185, and the guide groove 309 may be provided in the second lens frame 130b. In addition, a member to be engaged with the guide groove 309 is not limited to the pin. As long as the member is movable along the guide groove 309 and rotatably supports the lens unit 185, a member having any shapes (e.g., a spherical member) may be employed.

In the foregoing embodiment, the image stabilizing device has been described as one example of the lens drive unit, but the present disclosure is not limited to the image stabilizing device. That is, as long as the lens drive unit is configured so that the movable member including the lens is rotatably supported, and the movable member moves in the plane perpendicular to the optical axis, the configurations of the embodiments of the present disclosure may be employed.

Figure 18:
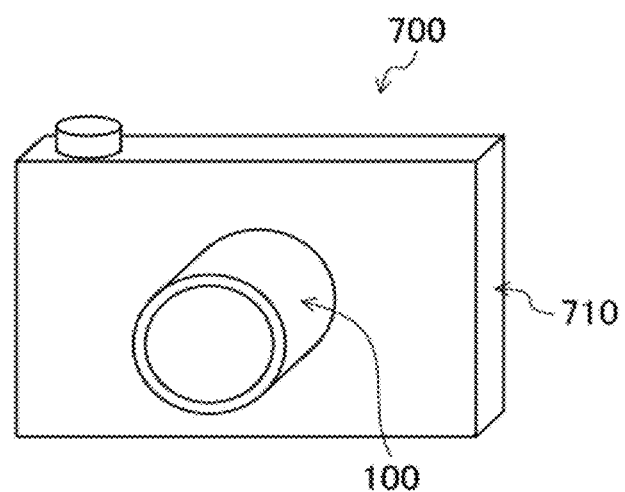
FIG. 18 is a perspective view of an imaging apparatus.

As illustrated in FIG. 18, the lens barrel 100 and a camera body 710 to which the lens barrel 100 is attached form an imaging apparatus 700.

As described above, the technique disclosed herein is useful for the lens drive unit, the lens barrel, and the imaging apparatus.

The description of the embodiments of the present disclosure is given above for the understanding of the present disclosure. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A lens drive unit, comprising:

a movable member including a lens; and a guide portion configured to movably guide the movable member back and forth along a predetermined direction and rotatably guide the movable member about a predetermined rotational axis, in a plane perpendicular to an optical axis of the lens, wherein a distance between a gravity center G of the movable member and the rotational axis is equal to or less than $\sqrt{0.2 J/M}$, where "J" represents inertia moment of the movable member about the gravity center, and "M" represents mass of the movable member.

2. The lens drive unit of claim 1, further comprising:

two drive portions configured to drive the movable member, wherein a distance from the rotational axis to one of the drive portions is equal to or shorter than twice a distance from the rotational axis to the other drive portion, and the two drive portions and the rotational axis are not arranged in line.

3. A lens barrel, comprising:

the lens drive unit of claim 1.

4. An imaging apparatus, comprising:

the lens drive unit of claim 1.

* * * * *